United States Patent
Pekola

[11] Patent Number: 5,947,601
[45] Date of Patent: Sep. 7, 1999

[54] THERMOMETER BASED ON CB TUNNELLING

[75] Inventor: Jukka Pekola, Jyväskylä, Finland

[73] Assignee: Nanoway Oy, Jyvaskyla, Finland

[21] Appl. No.: 08/871,233

[22] Filed: Jun. 9, 1997

[30] Foreign Application Priority Data

Jun. 11, 1996 [FI] Finland ..................................... 962424
Jan. 14, 1997 [FI] Finland ..................................... 970136

[51] Int. Cl.$^6$ ................................................. G01K 7/00
[52] U.S. Cl. ........................... 374/163; 374/178; 374/183
[58] Field of Search ................................... 374/163, 172, 374/178–185

[56] References Cited

U.S. PATENT DOCUMENTS 4,747,698   5/1988   Wickramasinghe ........................... 374/6
5,218,297   6/1993   Nakano .................................. 524/248
5,634,718   6/1997   Martinis et al. ........................... 574/32

FOREIGN PATENT DOCUMENTS 0327123   8/1989   European Pat. Off. .

OTHER PUBLICATIONS

K.P. Hirvi E.A.: "Arrays of Normal Metal Tunnel Junctions in Weak Coulomb Blockade Regime" Applied Physics Letters., vol. 67, No. 14, Oct. 2, 1995 New York, US, pp. 2096–2098.

*Primary Examiner*—Vit Miska
*Attorney, Agent, or Firm*—Fildes & Outland, P.C.

[57] ABSTRACT

A thermometer based on CB tunnelling includes a sensor component and devices for measuring its voltage-current dependence. The sensor includes a chain of several, at least ten, nanoscale tunnel junctions and connection electrodes for connecting the measurement devices to the ends of the chain. The temperature is determined in a manner that is, as such, known, on the basis of the characteristic quantities of the descriptor $G/G_T$ of the voltage-current dependence. The measurement array of the sensor includes several tunnel junction chains connected in parallel, for decreasing the total impedance of the array.

7 Claims, 3 Drawing Sheets

THERMOMETER BASED ON CB TUNNELLING

FIELD OF THE INVENTION

This invention relates to a thermometer based on CB tunnelling, which comprises a sensor component and devices for measuring its voltage-current dependence, and in which the sensor includes a chain of several, at least ten, nanoscale tunnel junctions on a semiconductor base and connection electrodes for connecting the measurement devices to the ends of the chain. In each tunnel junction, the resistance is at least 10 k$\Omega$, and in which the temperature T is determined in a way that is, as such, known, on the basis of the characteristic quantities of the graph $G/G_T$ of the voltage/current dependence.

BACKGROUND OF THE INVENTION

A thermometer based on the Coulomb blockade and its principles has been described in the journals Physical Review Letters, Vol. 73, No. 21, Nov. 21, 1994, pp. 2903–2906; Applied Physics Letters, 67(14), Oct. 2, 1995, pp. 2096–2098; and Journal of Low Temperature Physics, Vol. 101, Nos. 1/2, October 1995, pp. 17–24. In the sensor of the thermometer there are several tunnel junctions arranged as a sequential chain. The phenomenon known as the Coulomb blockade causes a conductance drop at the zero point of the bias voltage, the characteristic quantities of which depend on the temperature. The method is based on the joint effect of the charging energy $E_c = e^2/2C$, where C is the capacitance of the junction in question, of the very small capacitor formed by the small metallic island isolated by the tunnel junctions, and the thermal energy $k_B T$. It becomes apparent that when the voltage-current characteristic curve of the chain of tunnel junctions is measured, more precisely as a function of the voltage affecting its dynamic resistance over the tunnel junction, a zero-center peak can be observed, the width of which is directly proportional to the temperature, and its absolute value corresponds to that calculated theoretically with a very high degree of accuracy. This property makes the thermometer a primary thermometer. On the other hand, the height of the peak is in inverse proportion to the temperature, which in turn provides a secondary thermometer.

Primary thermometers are rare, particularly at low temperatures. Some few in this category are the (ideal) gas thermometer at a temperature of more than 3 K, the nuclear orientation thermometer at temperatures of 3–50 mK, and the noise thermometer. A thermometer based on CB-tunneling (CBT), offers several advantages compared with those.

In practice, there are, however problems in CBT applications. First, the total impedance of the sensor becomes very great. In order that the theory can be realized in the tunnelling event itself as accurately as possible, the resistance $R_T$ of each tunnel junction must be clearly greater than the quantum resistance $R_K \equiv h/e^2 \approx 4$ k$\Omega$. In practice, $R_T \approx 20$ k$\Omega$ has been shown to be sufficient. On the other hand, in order that the a detrimental effect of the ends of the tunnel junction chain on the operation of the sensor is minimized, there must be at least N≈20 junctions in the series. These two conditions combined give a "good" sensor minimum impedance (resistive) of $Z_{min} \approx 400$ k$\Omega$. Such a high level of impedance causes problems, especially if the distance between the sensor and the electronics controlling it, and with it the capacitance of the measurement leads, increase.

Secondly, the temperature range of the sensors should be increased. The optimal temperature of the tunnel junction chain is determined by the capacitance C of the tunnel junctions. The temperature range of a sensor can nowadays be brought to slightly less than two decades. The upper limit temperature is determined by the signal-noise ratio of the measurement, in other words, the smallest measurable conductance peak. The lower limit temperature of each sensor is for its part determined by the fact that the sensor will no longer operate, as might be expected from the simple series development, if the relative height of the peak grows so that $\Delta G/G_T \geq 0.2$.

Thirdly, a frequent problem at temperatures of less than 1 K is the fact that the current flowing through the chain heats the sensor, so that the electron temperature, which is being measured here, rises above the temperature of the substrate.

A fourth type of a problem worth mentioning, is that particularly relating to the present material, aluminum. First, aluminum is a superconducting metal at temperatures of less than 1K. Because the sensor only works as a normal metal, a powerful magnetic field of about 0.5 T is required, by means of which the aluminum can be kept normal at ever lower temperatures. Secondly, at temperatures greater than 50 K the limiting factor becomes the height of the Al/AlO$_x$/Al tunnel barrier, which is about 2 eV.

The invention is intended to resolve the above problems.

SUMMARY OF THE INVENTION

The present invention provides a thermometer based on CB tunnelling, which comprises a sensor component and devices for measuring its voltage-current dependence, and in which the sensor includes a chain of several, at least ten, nanoscale tunnel junctions and connection electrodes for connecting the measurement devices to the ends of the chain, and in which the resistance of each tunnel junction is at least 10 k$\Omega$, and in which the temperature is determined in a manner that is, as such, known, on the basis of the characteristic quantities of the descriptor $G/G_T$ of the voltage-current dependence, characterized in that the measurement array of the sensor includes several tunnel junction chains connected in parallel, for measuring the total impedance of the array.

The arrays are formed of tunnel junction chains adapted to at least two different temperature ranges formed in the same sensor, each of which is connected at least at one end to the same connection electrode and that the opposite ends are connected to different electrodes and the voltage-current measurement devices comprise devices for selecting the desired array.

The measurement range of extends to the temperature range below 1 K, and is characterized in that the conductors between the tunnel junctions of the tunnel junctions chain of at least the lowest temperature range include an expansion part that enlarges their surface area, so that the electrons of the measurement current can thermalize and they do not heat the tunnel junctions.

The tunnel junction chains are manufactured by means of electron beam lithography on an oxide-surfaced Si-semiconducting substrate.

In on embodiment, the tunnel junctions comprise Al-metal conductors and an insulating layer of aluminum oxide in each tunnel junction. Therein, the measurement range extends to the temperature range below 1 K, and may be characterized in that the sensor includes devices, for example a device creating a powerful magnetic field, to maintain the normal conductance of the aluminum conductors.

Alternatively, the conducting material of the tunnel junctions belongs to the group chromium Cr, copper Cu, nickel Ni, and niobium Nb.

A thermometer according to the invention based on the Coulomb blockade has the following advantages.

1. The operating temperature range of each tunnel junction array is about two orders at the temperature and can be selected by making tunnel junctions of the desired size: the smaller the junction, the higher the temperature and vice versa. In practice, the smallest junction size that has been achieved at present is about 30 nm×30 nm, which corresponds to a temperature range of 1–100 K. With a larger junction size a temperature range of 0.05–4.2 K can be achieved.

Thus, the total temperature range of a sensor containing 2–3 arrays is 0.05–100 K.

2. Even a powerful magnetic field does not affect the operation and reading of the meter. This has been investigated at fields of up to 8 T.

3. In resistance measurements, it is possible to exploit the properties of the sensor as both a primary and secondary meter. The result is a fast and reliable device.

4. The manufacture of the sensor is based on modern nanotechnology and is thus highly repeatable and is suitable for even large numbers of sensors.

5. The sensor is very small.

These and other features and advantages of the invention will be more fully understood from the following detailed description of the invention taken together with the accompanying drawings.

DETAILED DESCRIPTION OF THE INVENTION

Figure 1:
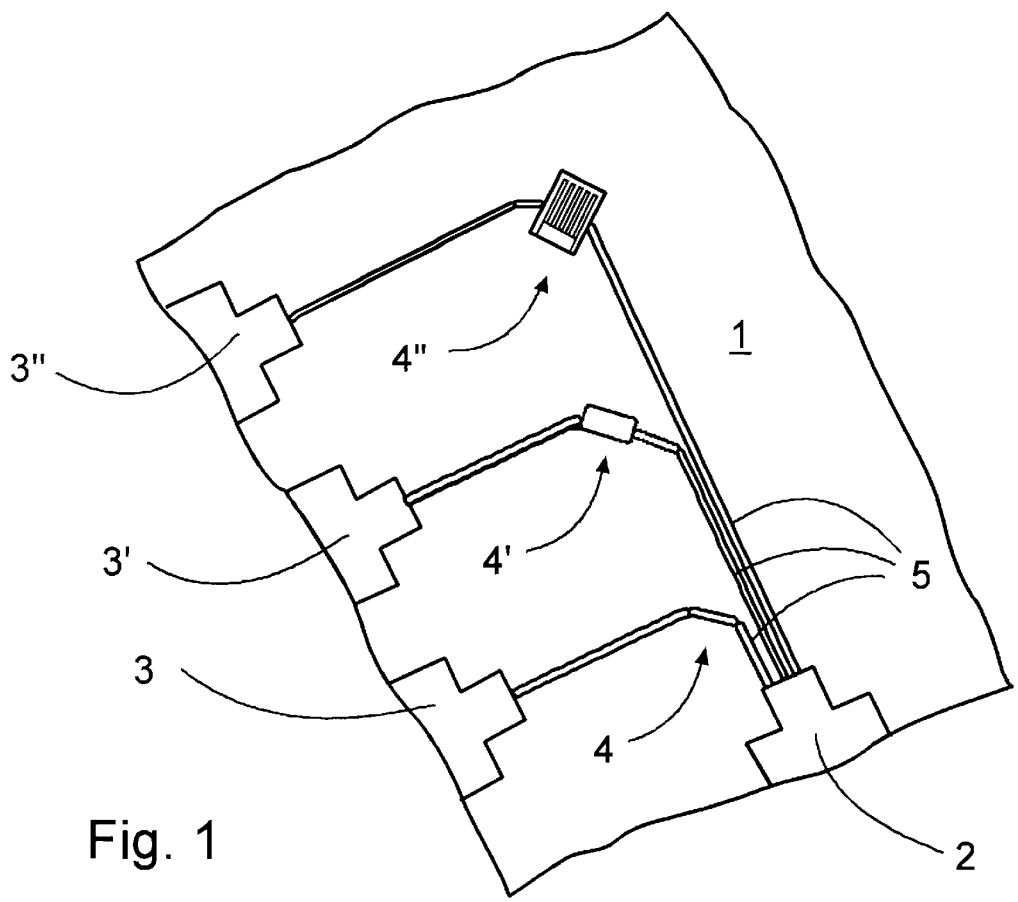
FIG. 1 shows the basic construction of a sensor consisting of three arrays on a semi-conducting substrate, with junction electrodes.

Referring now to the drawings in detail, the example sensor comprises of tunnel junction arrays 4, 4', and 4" adapted to three different temperature ranges, which are connected at one end to a common connecting electrode 2 and at the other end of each to its own connecting electrode 3, 3', and 3", with the aid of connecting conductors 5. The sensor is encased in the conventional manner of microcircuits, for example as an 8-pin socket of a standard-size. The desired array for measurement is selected by means of the measurement electronics.

Figure 2:
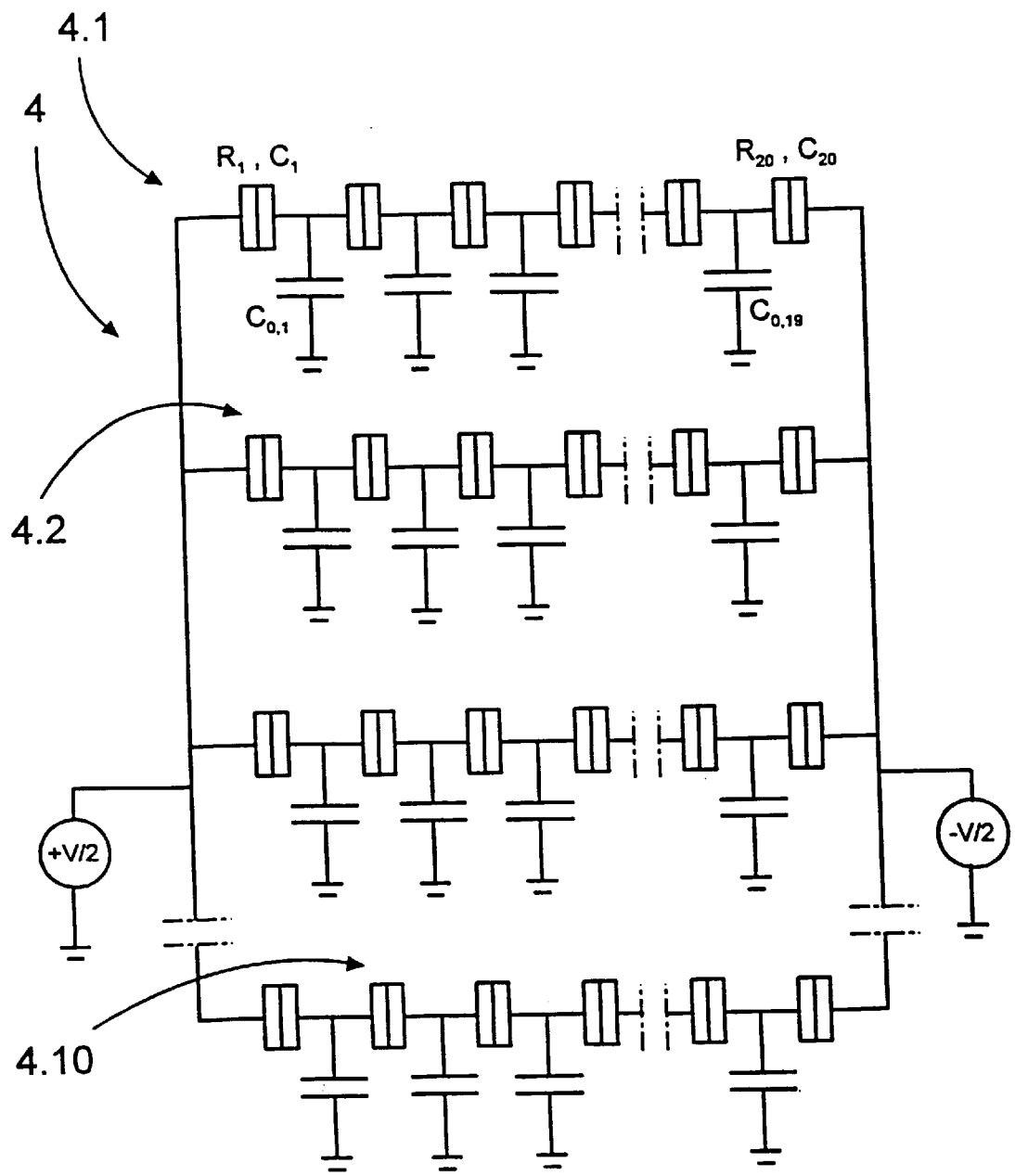
FIG. 2 shows the circuit diagram of one CB tunnel junction array.

All three arrays are according to FIG. 2. The measurement connection on the negative side of the arrays is connected in the manner described above, but the positive sides are separate. Array 4 of FIG. 2 consists of 10 identical tunnel junctions 4.1 . . . 4.10 connected in parallel. If the resistance of one chain is 400 kΩ, the resistance of the entire array is only 40 kΩ, when the problems referred to above are avoided. At its maximum, the total resistance may be at most 150 kΩ. Most advantageously, there are 4 or 5 chains in parallel, in which case manufacture is not unreasonably difficult, but the resistance of the array drops to less than 100 kΩ.

Figure 3:
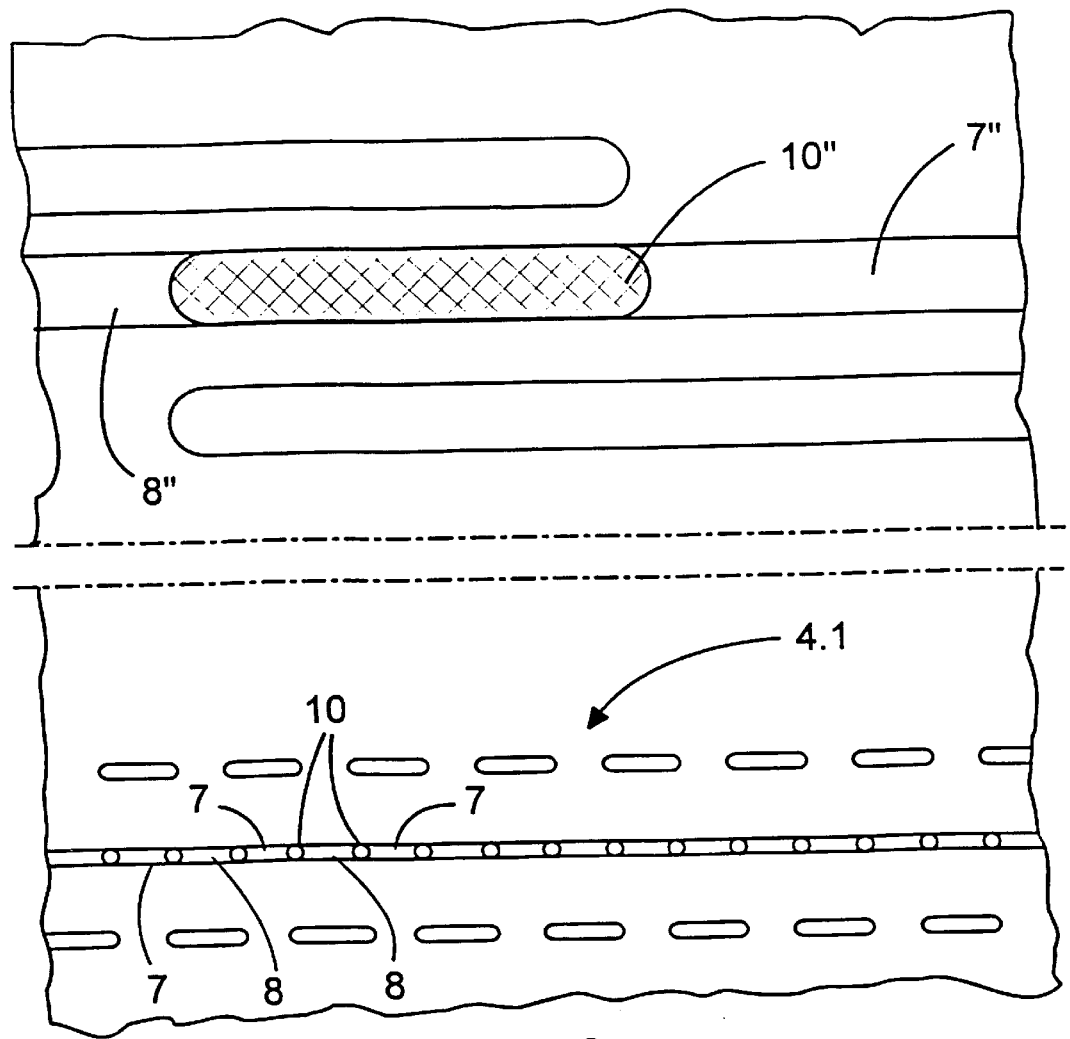
FIG. 3 shows tunnel junctions intended for different temperature ranges, formed on a silicon substrate, at the same scale.

FIG. 3 shows diagrammatically the manner of varying the geometry of the tunnel junction. The junction capacitance can be most easily adjusted by varying the surface area of the tunnel junction. The thickness of the thin oxide layer used as insulation is the same over the entire base. In the upper part of FIG. 3 is a low temperature range tunnel junction 10", with a surface area of about 1.5 $\mu m^2$. It arises with the aid of an insulating layer between conductors 7" and 8". In the lower part of FIG. 3, there is a high temperature range tunnel junction chain on the same scale. In this chain, too, there are 20 tunnel junctions in series, connected by conductors 7 and 8. The surface area of each tunnel junction is less than 0.01 $\mu m^2$.

Due to the manufacturing technique used, separate sections of a chain arise also on each side of the tunnel junction chain. However, these play no part in the operation of the sensor.

The tunnel junctions of the sensor are most advantageously manufactured using electron beam lithography, which achieves a much higher accuracy than when using photolithography.

Figure 4:
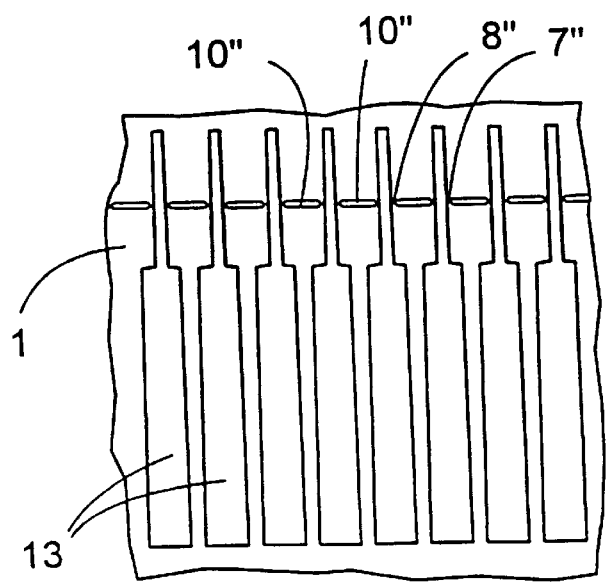
FIG. 4 shows the structure of the lowest temperature range tunnel junction chain, with the electron thermalization areas in the conductors between the junctions.

At low temperatures, less than 1 K, the measurement current begins to disturb the measurement, as stated above. This problem is resolved in the manner according to FIG. 4, in which the intermediate conductors 7 and 8 of the tunnel junction 10 are spread out to become a large cooling area 13 at the sides. In these areas, which are thus of aluminum (or similar), the electrons can thermalize. Electrons thermalize in the entire volume of the conductor and decelerate through interaction with the environment. The increase in capacitance is not detrimental. The substrate does not conduct in this temperature range.

4–5 parallel chains equipped with cooling areas are a suitable number, as a compromise between measurement and manufacturing techniques.

Figure 5:
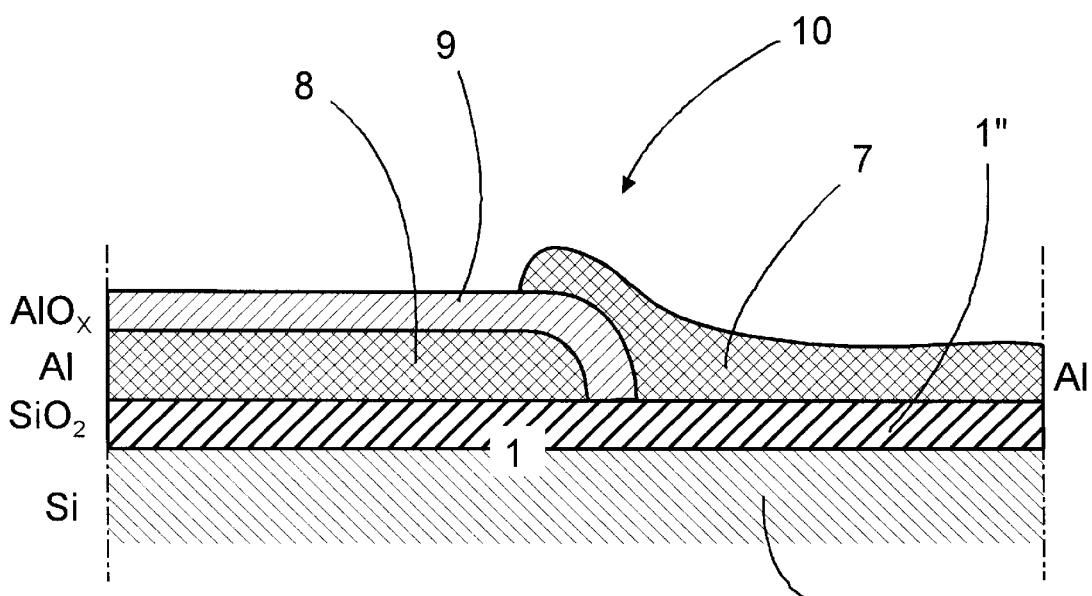
FIG. 5 shows the structure of a single tunnel junction in cross-section.

Tunnel junction 10 and the conductors 7 and 8 that it requires are formed on a pure silicon substrate 1, FIG. 5. For practical reasons, an oxide layer 1" is formed on the surface of the basic material 1', so that the sensor can be tested at room temperature. Using electron beam lithography, a conducting layer 8, an insulating layer 9, and a second conducting layer 7 are formed in a sequence. The tunnel junction 10 is formed at the junction between the conductors 7 and 8, where there is an insulating layer about 1 nm thick between them. In the figure, the thickness of the insulating layer 9 has been exaggerated. The thickness of conductors 7 and 8 is actually about 100 nm.

The dynamic behavior of a tunnel junction chain has been described in the publications referred to above. It is possible to derive the following formulae from them for performing measurement. The dimensionless conductance $G/G_T$ in such a chain, in which there are N tunnel junctions with a capacitance of C, can be approximately calculated from the formula $$G/G_T = 1 - \frac{\varepsilon_C}{k_B T} g(eV/Nk_B T), \text{ in which}$$

$$\varepsilon_C = 2\frac{(N-1)}{N}\frac{e^2}{2C}$$

Primarily, the temperature T is determined, in a thermometer based on CB tunnelling, on the basis of the descriptor $G/G_T$ from the formula $V_{1/2}=5,439\, N\, k_B T/e$, in which $V_{1/2}$ is the measured voltage difference of the conductance drop at the drop side depth, N is the number of tunnel junctions in the chain, $k_B$ is the Boltzmann constant, and e is the unit charge. The measurement of the temperature thus returns to become the measurement of the voltage. The determination of the full width at half minimum of the conductance drop does not demand absolute accuracy of the parameters, because it is determined on the basis of the relative data of the sensor. After the determination of the depth, the half value voltage values are sought at on both sides of the drop, the difference is $V_{1/2}$ to be sought.

The temperature can also be obtained from the equation in a secondary manner:

$$\Delta G/G_T = \frac{\varepsilon_C}{6k_B T}, \text{ in which}$$

$\Delta G/G_T$ is the depth of the dimensionless conductance drop.

To eliminate the drawbacks of aluminium, it may be replaced by another metal, such as chromium Cr, copper Cu, nickel Ni, or niobium Nb.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A thermometer based on CB tunnelling, which comprises a sensor component and devices for measuring its voltage-current dependence, and in which the sensor includes a chain of several, at least ten, nanoscale tunnel junctions and connection electrodes for connecting the measurement devices to the ends of the chain, and in which the resistance of each tunnel junction is at least 10 kΩ, and in which the temperature is determined on the basis of the characteristic quantities of the descriptor $G/G_T$ of the voltage-current dependence, characterized in that the measurement array of the sensor includes several tunnel junction chains connected in parallel, for measuring the total impedance of the array.

2. A CB thermometer according to claim 1, characterized in that there are arrays formed of tunnel junction chains adapted to at least two different temperature ranges formed in the same sensor, each of which is connected at least at one end to the same connection electrode and that the opposite ends are connected to different electrodes and the voltage-current measurement devices comprise devices for selecting the desired array.

3. A CB thermometer according to claim 2, the measurement range of which extends to the temperature range below 1 K, characterized in that the conductors between the tunnel junctions of the tunnel junctions chain of at least the lowest temperature range include an expansion part that enlarges their surface area, so that the electrons of the measurement current can thermalize and they do not heat the tunnel junctions.

4. A CB thermometer according to one of claim 1, characterized in that the tunnel junction chains are manufactured by means of electron beam lithography on an oxide-surfaced Si-semiconducting substrate.

5. A CB thermometer according to one of claim 1, characterized in that the tunnel junctions comprise Al-metal conductors and an insulating layer of aluminium oxide in each tunnel junction.

6. A CB thermometer according to claim 5, the measurement range of which extends to the temperature range below 1 K, characterized in that the sensor includes devices, for example a device creating a powerful magnetic field, to maintain the normal conductance of the aluminium conductors.

7. A CB thermometer according to one of claim 1, characterized in that, the conducting material of the tunnel junctions belongs to the group chromium Cr, copper Cu, nickel Ni, and niobium Nb.

* * * * *

UNITED STATES PATENT AND TRADEMARK OFFICE
CERTIFICATE OF CORRECTION

PATENT NO. : 5,947,601
DATED : September 7, 1999
INVENTOR(S) : Jukka Pekola

It is certified that error appears in the above-identified patent and that said Letters Patent is hereby corrected as shown below:

Column 1, line 56, "$\neq 4$" should read -- $\cong 4$ -- line 56, "$R_T \neq 20$" should read -- $R_T \cong 20$ --.

Column 1, line 60, "$N \neq 20$" should read -- $N \cong 20$ --.

Column 1, line 62, "$Z_{min} \neq 400$" should read -- $Z_{min} \cong 400$ --.

Signed and Sealed this

Twenty-second Day of February, 2000

Attest:

Q. TODD DICKINSON

*Attesting Officer*

*Commissioner of Patents and Trademarks*